(No Model.)
F. SPLITTSTOSER.
POLE ATTACHMENT FOR VEHICLES.
No. 415,585.      Patented Nov. 19, 1889.
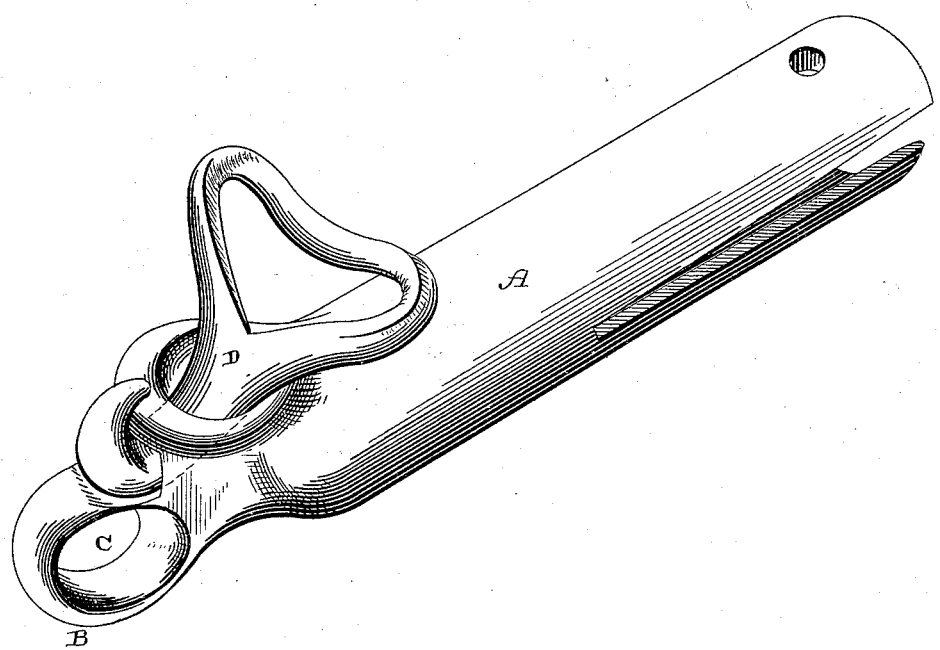
Witnesses:
E. P. Ellis,
L. J. Magie.
Inventor:
F. Splittstoser,
per
F. A. Lehmann,
Atty.

UNITED STATES PATENT OFFICE.

FERDINAND SPLITTSTOSER, OF NORTH BRANCH STATION, MINNESOTA.

POLE ATTACHMENT FOR VEHICLES.

SPECIFICATION forming part of Letters Patent No. 415,585, dated November 19, 1889.

Application filed September 23, 1889. Serial No. 324,801. (No model.)

*To all whom it may concern:*

Be it known that I, FERDINAND SPLITTSTOSER, of North Branch Station, in the county of Chisago and State of Minnesota, have invented certain new and useful Improvements in Pole Attachments; and I do hereby declare the following to be a full, clear, and exact description of the invention, such as will enable others skilled in the art to which it pertains to make and use it, reference being had to the accompanying drawing, which forms part of this specification.

My invention relates to an improvement in pole attachments; and it consists in a casting which is applied directly to the end of a pole or tongue of a vehicle, and which is provided with an opening through its top, and a second opening through its front lower corner, in combination with a hook which is fastened to the neck-yoke, and which catches in the upper opening in the casting, as will be more fully described hereinafter.

The object of my invention is to provide a casting or ferrule for the pole or tongue of a vehicle, and in which the neck-yoke hook is made to catch, and which affords means by which another animal or animals can be attached to the front end of the tongue or pole, if so desired.

The accompanying drawing represents a device which embodies my invention complete.

A represents a ferrule or casting, which is to be applied to the front end of a tongue or pole of a vehicle of any kind, and which is to be secured thereto in any suitable manner. Through the lower front corner B of this casting is made an opening C, in which one or more animals in front can be fastened when so desired. The upper front corner of this casting A is widened out to any desired extent, and through this part is made an opening, in which the hook D is made to catch. This hook D is made of any suitable construction, and is fastened to the usual neck-yoke. The hook has its lower end to project through the opening in the upper corner of the casting, as shown, and while the team is hitched to the vehicle the hook cannot be detached, because the animals are made to exert a sufficient backward pull upon the breast straps or chains to prevent any possibility of the hook from becoming detached. This hook is intended to be readily and quickly detached from the tongue or pole whenever desired without the necessity of having to loosen the breast straps or chains.

Having thus described my invention, I claim—

1. A ferrule or casting to be applied to the front end of a pole or tongue, and which is provided with an opening through its upper front corner, in combination with the neck-yoke hook, which is made to catch in the opening, substantially as shown.

2. The combination of a ferrule or casting applied to the front end of a pole or tongue, and which is provided with the lower projecting corner B, having an opening C, and an opening through its upper front corner, in combination with a neck-yoke hook, which is made to extend through this opening, substantially as described.

In testimony whereof I affix my signature in presence of two witnesses.

FERDINAND SPLITTSTOSER.

Vitnesses:
HANS J. GOULDBERG,
H. G. ERICKSON.